US007668610B1

(12) United States Patent
Bennett

(10) Patent No.: US 7,668,610 B1
(45) Date of Patent: Feb. 23, 2010

(54) DECONSTRUCTING ELECTRONIC MEDIA STREAM INTO HUMAN RECOGNIZABLE PORTIONS

(75) Inventor: Victor Bennett, Berkeley, CA (US)

(73) Assignee: Google Inc., Mountain View, CA (US)

( * ) Notice: Subject to any disclaimer, the term of this patent is extended or adjusted under 35 U.S.C. 154(b) by 545 days.

(21) Appl. No.: 11/289,527

(22) Filed: Nov. 30, 2005

(51) Int. Cl.
*G06F 17/00* (2006.01)
*G10H 1/18* (2006.01)

(52) U.S. Cl. .............................. 700/94; 84/600; 84/615

(58) Field of Classification Search ................... 84/600; 704/248, 249, 250; 382/173, 212, 224
See application file for complete search history.

(56) References Cited

U.S. PATENT DOCUMENTS

| | | | | |
|---|---|---|---|---|
| 6,225,546 | B1 * | 5/2001 | Kraft et al. | 84/609 |
| 6,542,869 | B1 | 4/2003 | Foote | 704/500 |
| 6,674,452 | B1 * | 1/2004 | Kraft et al. | 715/765 |
| 6,965,546 | B2 * | 11/2005 | Tagawa et al. | 369/30.19 |
| 7,038,118 | B1 | 5/2006 | Gimarc | |
| 7,179,982 | B2 | 2/2007 | Goto | |
| 7,232,948 | B2 | 6/2007 | Zhang | |
| 2001/0003813 | A1 * | 6/2001 | Sugano et al. | 704/500 |
| 2004/0170392 | A1 * | 9/2004 | Lu et al. | 386/96 |
| 2005/0102135 | A1 * | 5/2005 | Goronzy et al. | 704/213 |
| 2006/0065102 | A1 * | 3/2006 | Xu | 84/600 |
| 2006/0080095 | A1 * | 4/2006 | Pinxteren et al. | 704/233 |
| 2006/0212478 | A1 | 9/2006 | Plastina et al. | |
| 2006/0288849 | A1 * | 12/2006 | Peeters | 84/616 |

OTHER PUBLICATIONS

Charles Fox, "Genetic Hierarchical Music Structures"; Clare College, Cambridge; May 2000; Appendix E; 4 pages.
Abdallah et al., "Theory and Evaluation of a Bayesian Music Structure Extractor", Proceedings of the Sixth International Conference on Music Information, University of London, 2005, 6 pages.
Aucouturier et al., "Segmentation of Musical Signals Using Hidden Markov Models", Proceedings of the Audio Engineering Society $110^{th}$ Convention, King's College, 2001, 8 pages.
Foote et al., "Media Segmentation using Self-Similarity Decomposition", Proceedings—SPIE The International Society for Optical Engineering, 2003, 9 pages.
Foote, "Methods for the Automatic Analysis of Music and Audio", In Multimedia Systems, 1999, 19 pages.
Goto, "A Chorus-Section Detecting Method for Musical Audio Signals", Japan Science and Technology Corporation, IEEE International Conference on Acoustics, Speech, and Signal Processing, pp. V437-440, 2003, 4 pages.

(Continued)

*Primary Examiner*—Curtis Kuntz
*Assistant Examiner*—Joseph Saunders, Jr.
(74) *Attorney, Agent, or Firm*—Harrity & Harrity, LLP

(57) ABSTRACT

A system trains a first model to identify portions of electronic media streams based on first attributes of the electronic media streams and/or trains a second model to identify labels for identified portions of the electronic media streams based on at least one of second attributes of the electronic media streams, feature information associated with the electronic media streams, or information regarding other portions within the electronic media streams. The system inputs an electronic media stream into the first model, identifies, by the first model, portions of the electronic media stream, inputs the electronic media stream and information regarding the identified portions into the second model, and/or determines, by the second model, human recognizable labels for the identified portions.

37 Claims, 9 Drawing Sheets

OTHER PUBLICATIONS

Peeters et al., "Toward Automatic Music Audio Summary Generation from Signal Analysis", Proceedings International Conference on Music Information Retrieval, 2002, 7 pages.

Visell "Spontaneous organisation, pattern models, and music", Organised Sound, 9(2), p. 151-165, 2004.

Hainsworth S., et al.: The Automated Music Transcription Problem; retrieved online at: http://citeseerx.ist.psu.edu/viewdoc/summary?doi=10.1.1.9.9571, 23 pages.

U.S. Appl. No. 11/289,433, filed Nov. 30, 2005 entitled "Automatic Selection of Representative Media Clips", by Victor Bennett, 36 pages, 14 pages of drawings.

* cited by examiner

FIG. 8

O SUSANNA

0:00

PORTION #1

I came from Alabama
With my banjo on my knee,
I'm goin' to Louisiana
My true love for to see;
It rained all night the day I left,
The weather it was dry;
The sun so hot I froze to death;
Susanna, don't you cry.

0:18

PORTION #2

O, Susanna,
O, don't you cry for me,
I've come from Alabama
With my banjo on my knee.
O, Susanna,
O, don't you cry for me,
'Cause I'm goin' to Louisiana,
My true love for to see.

0:38

PORTION #3

I had a dream the other night
When ev'rything was still;
I thought I saw Susanna
A-comin' down the hill;
The buckwheat cake was in her mouth,
The tear was in her eye;
Says I, I'm comin' from the south,
Susanna, don't you cry.

0:58

PORTION #4

O, Susanna,
O, don't you cry for me,
I've come from Alabama
With my banjo on my knee.
O, Susanna,
O, don't you cry for me,
'Cause I'm goin' to Louisiana,
My true love for to see.

1:18

PORTION #5

I soon will be in New Orleans,
And then I'll look around,
And when I find Susanna
I'll fall upon the ground.
And if I do not find her,
Then I will surely die,
And when I'm dead and buried,
Susanna, don't you cry.

1:38

PORTION #6

O, Susanna,
O, don't you cry for me,
I've come from Alabama
With my banjo on my knee.
O, Susanna,
O, don't you cry for me,
'Cause I'm goin' to Louisiana,
My true love for to see.

1:58

FIG. 9

PORTION #1

VERSE 1

I came from Alabama
With my banjo on my knee,
I'm goin' to Louisiana
My true love for to see;
It rained all night the day I left,
The weather it was dry;
The sun so hot I froze to death;
Susanna, don't you cry.

PORTION #'s 2, 4, 6

CHORUS

O, Susanna,
O, don't you cry for me,
I've come from Alabama
With my banjo on my knee.
O, Susanna,
O, don't you cry for me,
'Cause I'm goin' to Louisiana,
My true love for to see.

PORTION #3

VERSE 2

I had a dream the other night
When ev'rything was still;
I thought I saw Susanna
A-comin' down the hill;
The buckwheat cake was in her mouth,
The tear was in her eye;
Says I, I'm comin' from the south,
Susanna, don't you cry.

PORTION #5

VERSE 3

I soon will be in New Orleans,
And then I'll look around,
And when I find Susanna
I'll fall upon the ground.
And if I do not find her,
Then I will surely die,
And when I'm dead and buried,
Susanna, don't you cry.

DECONSTRUCTING ELECTRONIC MEDIA STREAM INTO HUMAN RECOGNIZABLE PORTIONS

BACKGROUND

1. Field of the Invention

Implementations described herein relate generally to parsing of electronic media and, more particularly, to the deconstructing of an electronic media stream into human recognizable portions.

2. Description of Related Art

Existing techniques for parsing audio streams are either frequency-based or word-based. Frequency-based techniques interpret an audio stream based on a series of concurrent wave forms representing vibration frequencies that produce sound. This wave from analysis can be considered longitudinal in the sense that each second of audio will have multiple frequencies. Word-based techniques interpret an audio stream like spoken word commands in which an attempt is made to automatically distinguish lyrics as streams of text.

Neither technique is sufficient to adequately distinguish an electronic media stream into human recognizable portions.

SUMMARY

According to one aspect, a method may include training a model to identify portions of electronic media streams based on attributes of the electronic media streams; inputting an electronic media stream into the model; and identifying, by the model, portions of the electronic media stream.

According to another aspect, a method may include training a model to identify human recognizable labels for portions of electronic media streams based on at least one of attributes of the electronic media streams, feature information associated with the electronic media streams, or information regarding other portions within the electronic media streams; identifying portions of an electronic media stream; inputting the electronic media stream and information regarding the identified portions into the model; and determining, by the model, human recognizable labels for the identified portions

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 7-9 are diagrams of an exemplary implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

As used herein, "electronic media" may refer to different forms of audio and video information, such as radio, sound recordings, television, video recording, and streaming Internet content. The description to follow will describe electronic media in terms of audio information, such as an audio stream or file. It should be understood that the description may equally apply to other forms of electronic media, such as video streams or files.

Overview

Figure 1:
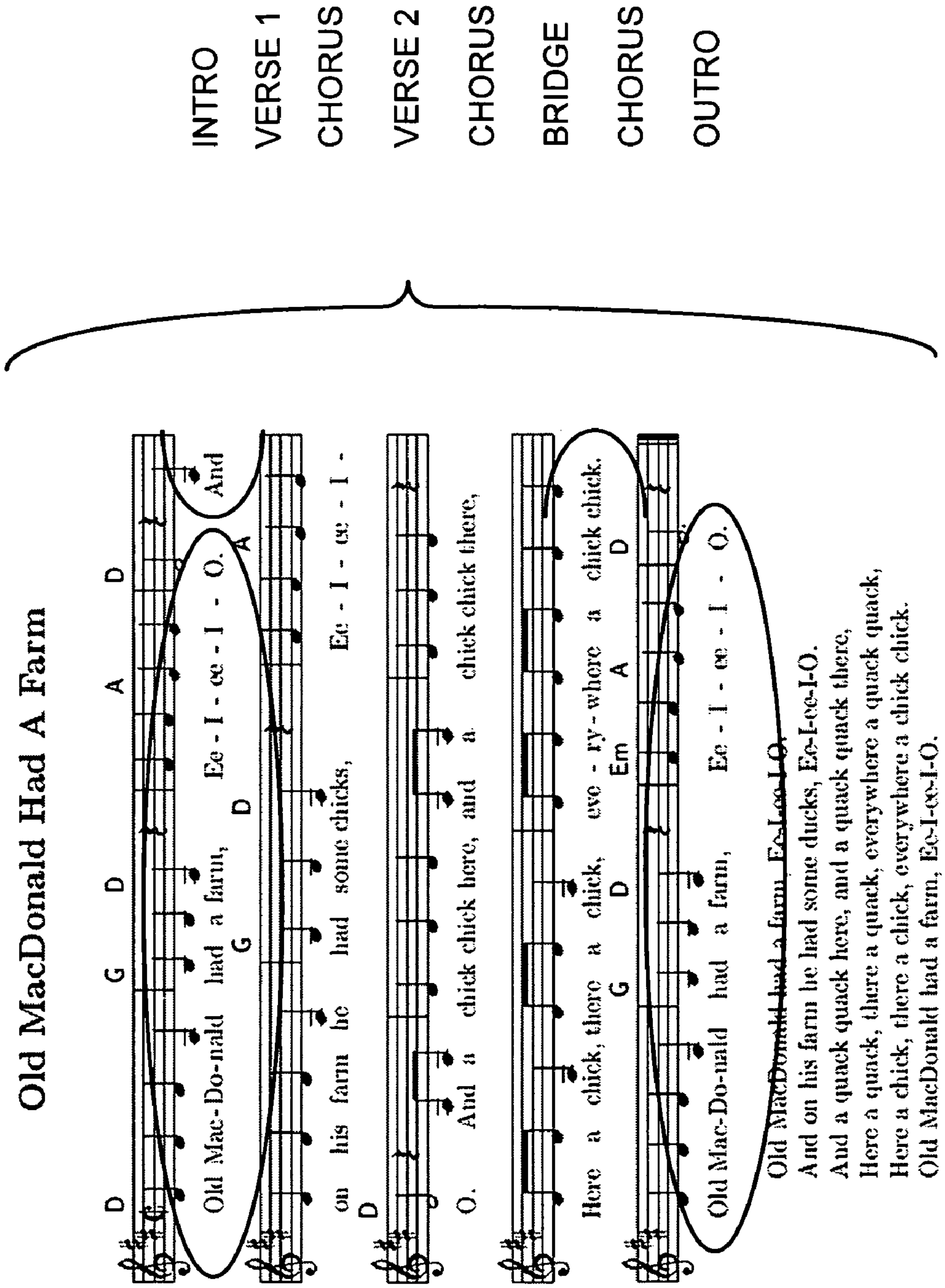
FIG. 1 illustrates a concept consistent with principles of the invention.

FIG. 1 illustrates a concept consistent with principles of the invention. As shown in FIG. 1, an audio stream, such as a music file or stream, may be deconstructed into human recognizable portions, such as the introduction (or intro), the verses (verse 1, verse 2, etc.), the bridge, the chorus, and the outro (or coda). For example, instances (e.g., time points) in the audio stream may be analyzed to determine whether they are the beginning (or end) of a portion.

Once the portions of the audio stream have been identified, a label may be associated with each of the portions. For example, a portion at the beginning of the audio stream may be labeled the intro, a portion that generally includes sound within the vocal frequency that may include the same or similar chord progression with slightly different lyrics as another portion may be labeled the verse, a portion that repeats with generally the same lyrics may be labeled the chorus, a portion that occurs somewhere within the audio stream other than the beginning or end with possibly different vocal and/or instrumental frequencies than the verses or chorus may be labeled the bridge, and a portion at the end of the audio stream that may trail off of the last chorus may be the outro.

The labels may be stored with their associated audio stream as metadata. The labels may be useful in a number of ways. For example, the labels may be used for intelligently selecting audio clips, intelligent skipping, searching the audio stream, metadata prediction, and clustering. Intelligently selecting audio clips might identify that portion of the audio stream, such as the chorus, to serve as a representation of the audio stream. Intelligent skipping might provide a better user experience when the user is listening to the audio stream by permitting the user to skip forward (or backward) to the beginning of the next (or previous) portion.

Searching the audio stream may permit the entire portion of the audio stream that contains the searched for term to be played instead of just the actual occurrence of the searched for term, which may improve the user's search experience. Metadata prediction may use the labels to predict metadata, such as the genre, associated with the audio stream. For example, certain signatures (e.g., arrangements of the different portions) may be suggestive of certain genres. Clustering may be valuable in identifying similar songs for suggestion to a user.

For example, audio streams with similar signatures may be identified as related and associated with a same cluster.

Exemplary System

Figure 2:
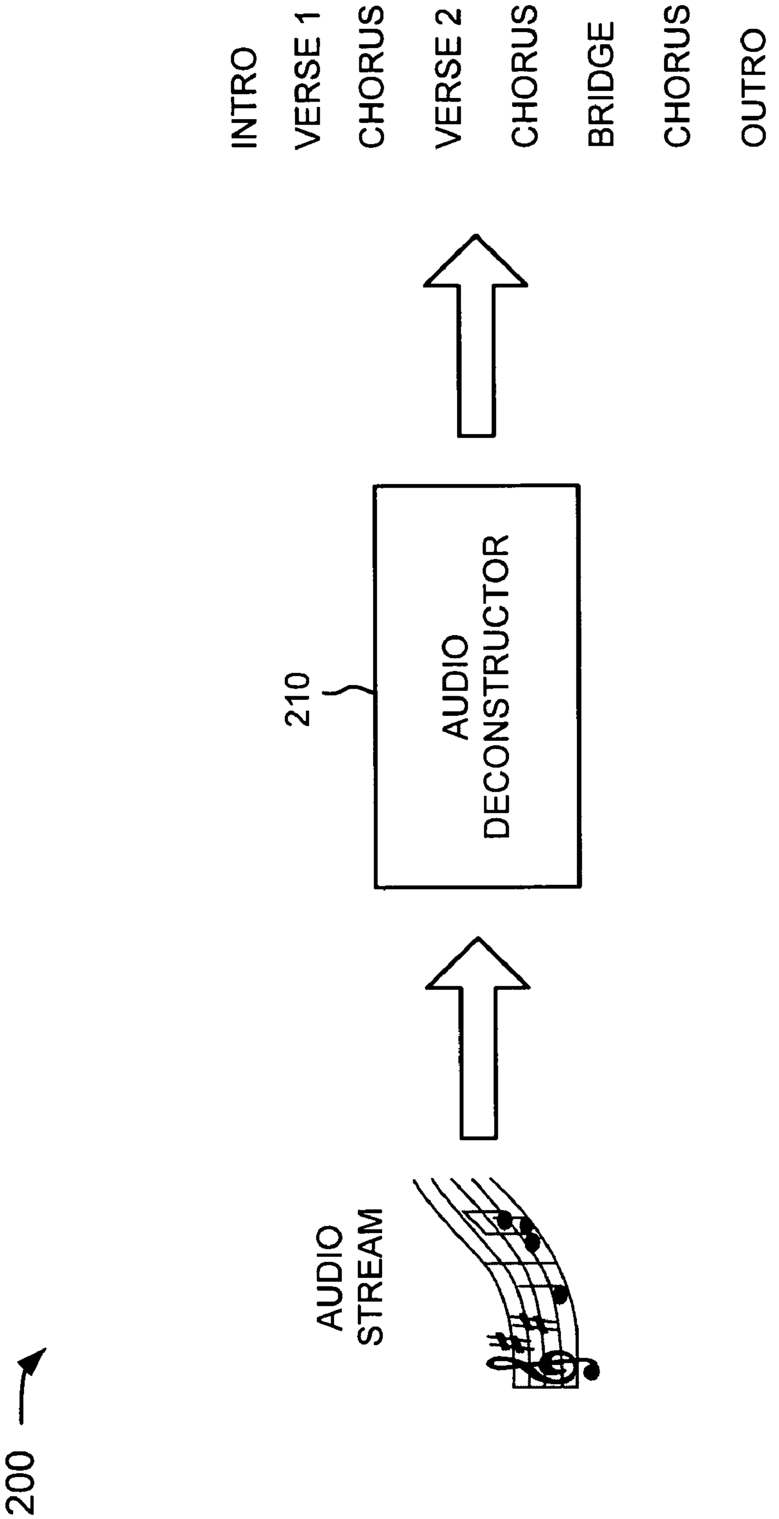
FIG. 2 is a diagram of an exemplary system in which systems and methods consistent with the principles of the invention may be implemented.

FIG. 2 is an exemplary diagram of a system 200 in which systems and methods consistent with the principles of the invention may be implemented. As shown in FIG. 2, system 200 may include audio deconstructor 210. In one implementation, audio deconstructor 210 is implemented as one or more devices that may each include any type of computing device capable of receiving an audio stream and deconstructing the audio stream into one or more human recognizable portions.

Figure 3:
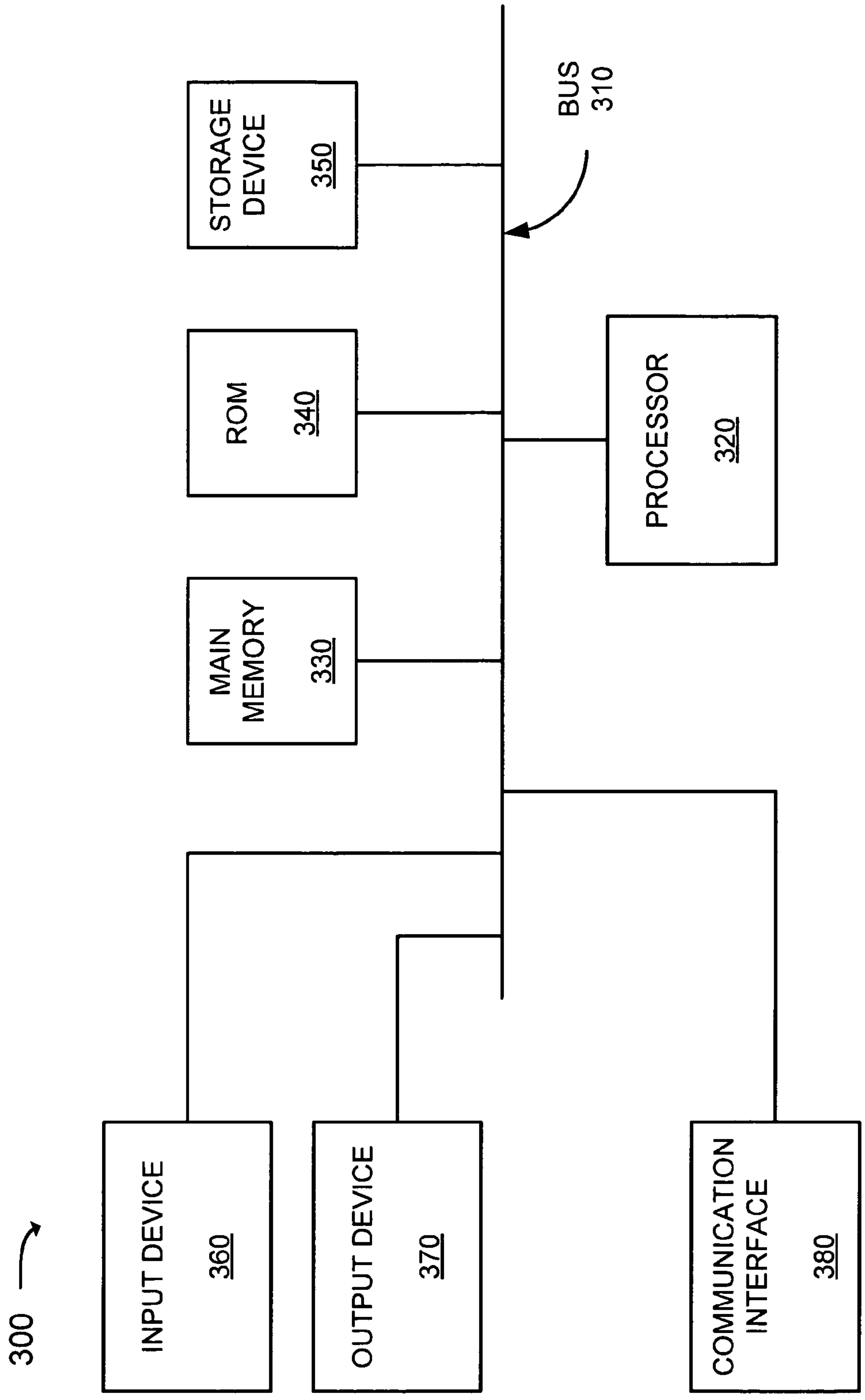
FIG. 3 is an exemplary diagram of a device that may be used to implement the audio deconstructor of FIG. 2.

FIG. 3 is an exemplary diagram of a device 300 that may be used to implement audio deconstructor 210. Device 300 may include a bus 310, a processor 320, a main memory 330, a read only memory (ROM) 340, a storage device 350, an input device 360, an output device 370, and a communication interface 380. Bus 310 may include a path that permits communication among the elements of device 300.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to device 300, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables device 300 to communicate with other devices and/or systems.

As will be described in detail below, audio deconstructor 210, consistent with the principles of the invention, may perform certain audio processing-related operations. Audio deconstructor 210 may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 4:
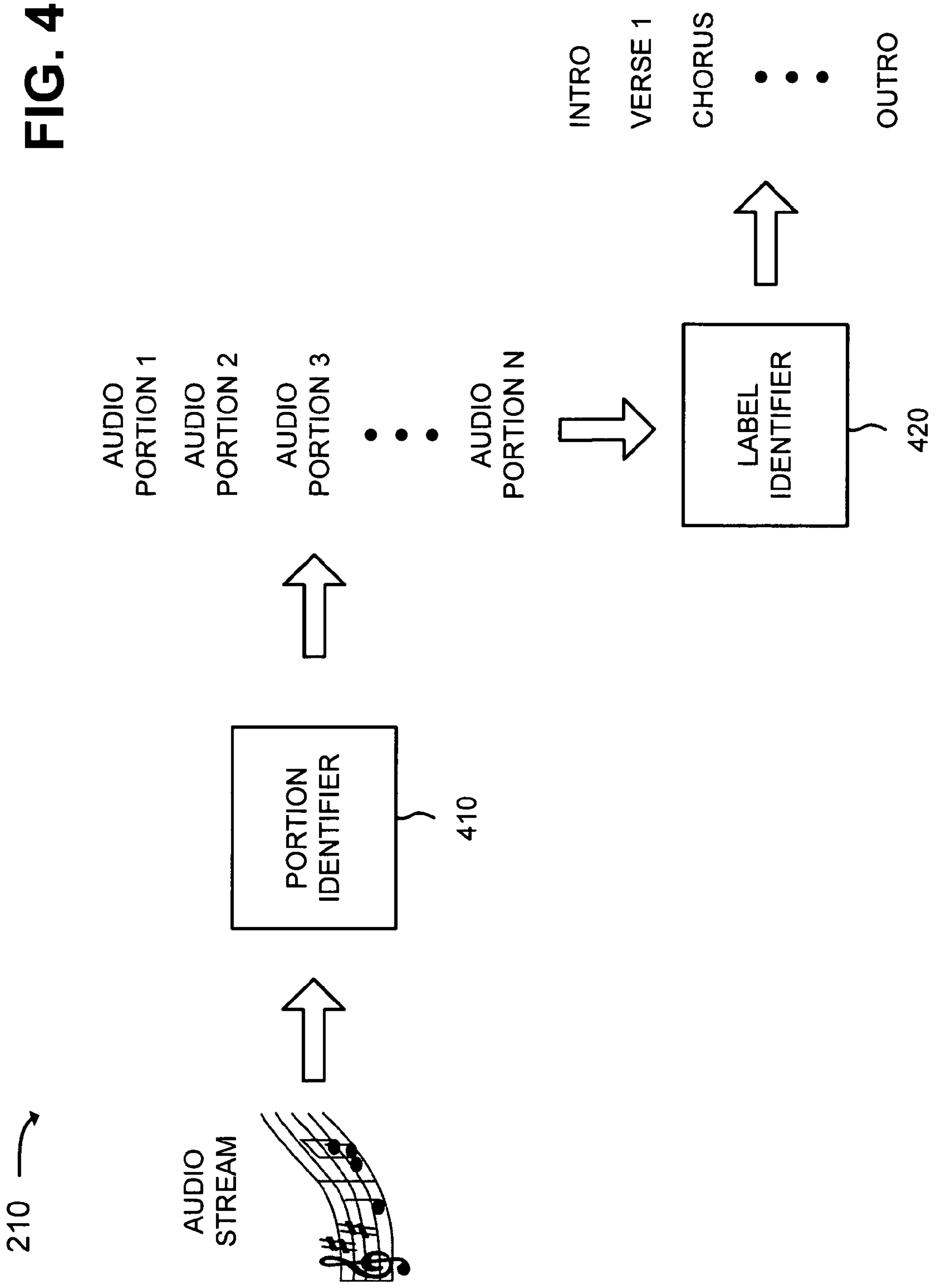
FIG. 4 is an exemplary functional diagram of the audio deconstructor of FIG. 2.

FIG. 4 is an exemplary functional diagram of audio deconstructor 210. Audio deconstructor 210 may include portion identifier 410 and label identifier 420. Portion identifier 410 may receive an audio stream, such as a music file or stream, and deconstruct the audio stream into audio portions (e.g., audio portion 1, audio portion 2, audio portion 3, . . . , audio portion N (where $N \geqq 2$)). In one implementation, portion identifier 410 may be based on a model that uses a machine learning, statistical, or probabilistic technique to predict break points between the portions in the audio stream, which is described in more detail below. The input to the model may include the audio stream and the output of the model may include break point identifiers (e.g., time codes) relating to the beginning and end of each portion of the audio stream.

Label identifier 420 may receive the break point identifiers from portion identifier 410 and determine a label for each of the portions. In one implementation, label identifier 410 may be based on a model that uses a machine learning, statistical, or probabilistic technique to predict a label for each of the portions of the audio stream, which is described in more detail below. The input to the model may include the audio stream with its break point identifiers (which identify the portions of the audio stream) and the output of the model may include the identified portions of the audio stream with their associated labels.

Exemplary Model Generation System

Figure 5:
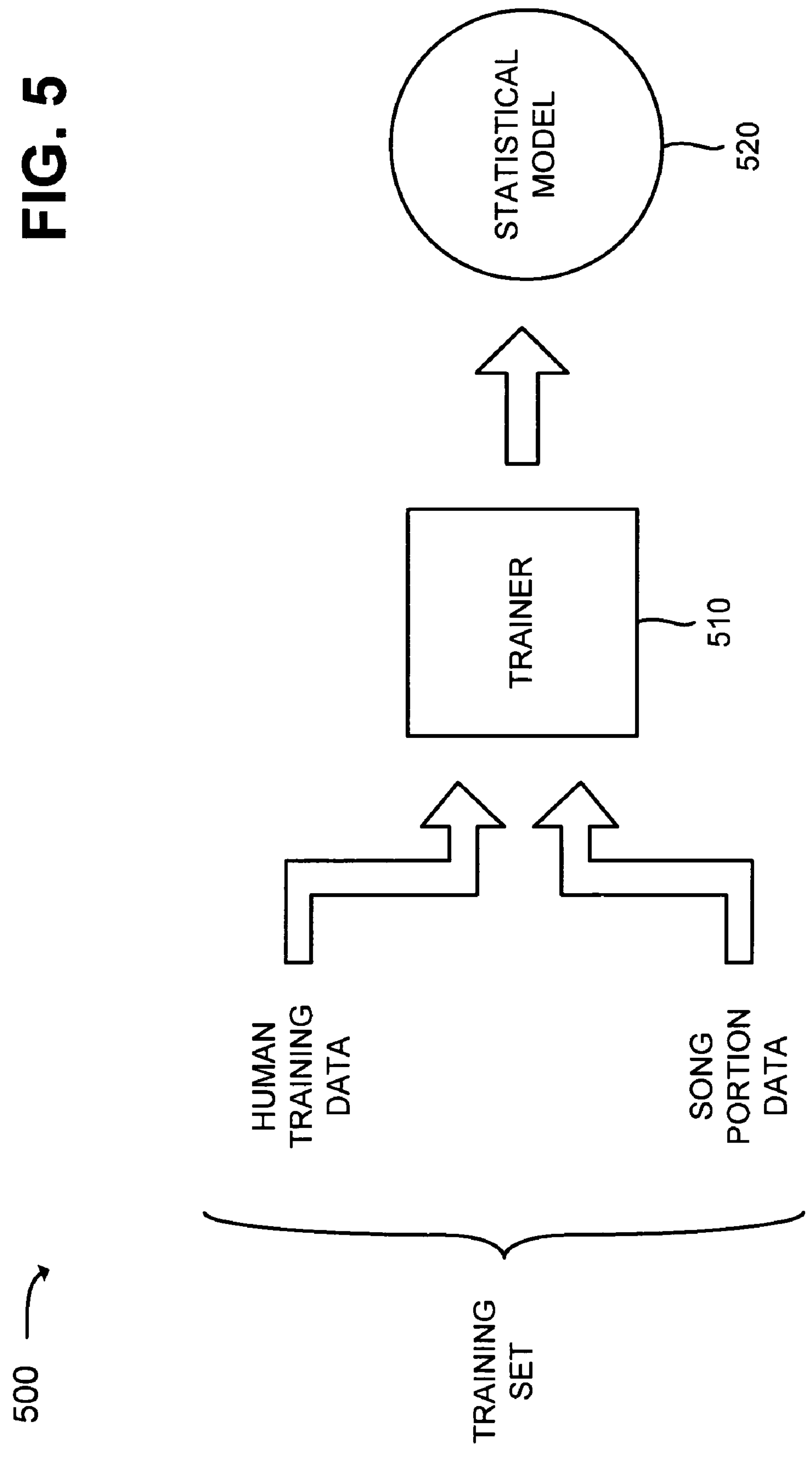
FIG. 5 is a diagram of an exemplary model generation system.

As described above, portion identifier 410 and/or label identifier 420 may be based on models. FIG. 5 is an exemplary diagram of a model generation system 500 that may be used to generate either of the models. Though system 500 may be used to generate either model, the information that system 500 uses to train the models to perform different functions may differ.

As shown in FIG. 5, system 500 may include a trainer 510 and a model 520. Trainer 510 may be used to train model 520 based on human training data and audio data. Model 520 may correspond to either the model for portion identifier 410 (hereinafter referred to as the "portion model") or the model for label identifier 420 (hereinafter referred to as the "label model"). While the portion model and the label model will be described as separate models that are trained differently, it may be possible for a single model to be trained to perform the functions of both models.

Portion Model

The training set for the portion model might include human training data and/or audio data. Human operators who are well versed in music might identify the break points between portions of a number of audio streams. For example, human operators might listen to a number of music files or streams and identify the break points among the intro, verse, chorus, bridge, and/or outro. The audio data might include a number of audio streams for which human training data is provided.

Trainer 510 may analyze attributes associated with the audio data and the human training data to form a set of rules for identifying break points between portions of other audio streams. The rules may be used to form the portion model.

Audio data attributes that may be analyzed by trainer 510 might include volume, intensity, patterns, and/or other characteristics of the audio stream that might signify a break point. For example, trainer 510 might determine that a change in volume within an audio stream is an indicator of a break point.

Additionally, or alternatively, trainer 510 might determine that a change in level (intensity) for one or more frequency ranges is an indicator of a break point. An audio stream may include multiple frequency ranges associated with, for example, the human vocal frequency range and one or more frequency ranges associated with the instrumental frequencies (e.g., a bass frequency, a treble frequency, and/or one or more mid-range frequencies). Trainer 510 may analyze changes in a single frequency range or correlate changes in multiple frequency ranges as an indicator of a break point.

Additionally, or alternatively, trainer 510 might determine that a change in pattern (e.g., beat pattern) is an indicator of a break point. For example, trainer 510 may analyze a window around each instance (e.g., time point) in the audio stream (e.g., ten seconds prior to and ten second after the instance) to compare the beats per second in each frequency range within the window. A change in the beats per second within one or more of the frequency ranges might indicate a break point. In one implementation, trainer 510 may correlate changes in the beats per second for all frequency ranges as an indicator of a break point.

Trainer 510 may generate rules for the portion model based on one or more of the audio data attributes, such as those identified above. Any of several well known techniques may be used to generate the model, such as logic regression, boosted decision trees, random forests, support vector machines, perceptrons, and winnow learners. The portion model may determine the probability that an instance in an audio stream is the beginning (or end) of a portion based on one or more audio data attributes associated with the audio stream:

P(portion|audio attribute(s)), where “audio attribute(s)” might refer to one or more of the audio data attributes identified above.

The portion model may generate a “score,” which may include a probability output and/or an output value, for each instance in the audio stream that reflects the probability that the instance is a break point. The highest scores (or scores above a threshold) may be determined to be actual break points in the audio stream. Break point identifiers (e.g., time codes) may be stored for each of the instances that are determined to be break points. Pairs of identifiers (e.g., a time code and the subsequent or preceding time code) may signify the different portions in the audio stream.

The output of the portion model may include break point identifiers (e.g., time codes) relating to the beginning and end of each portion of the audio stream.

Label Model

The training set for the label model might include human training data, audio data, and/or audio feature information (not shown in FIG. 5). Human operators who are well versed in music might label the different portions of a number of audio streams. For example, human operators might listen to a number of music files or streams and label their different portions, such as the intros, the verses, the choruses, the bridges, and/or the outros. The human operators might also identify genres (e.g., rock, jazz, classical, etc.) with which the audio streams are associated. The audio data might include a number of audio streams for which human training data is provided along with break point identifiers (e.g., time codes) relating to the beginning and end of each portion of the audio streams. Attributes associated with an audio stream may be used to identify different portions of the audio stream. Attributes might include frequency information and/or other characteristics of the audio stream that might indicate a particular portion. Different frequencies (or frequency ranges) may be weighted differently to assist in separating those one or more frequencies that provide useful information (e.g., a vocal frequency) over those one or more frequencies that do not provide useful information (e.g., a constantly repeating bass frequency) for a particular portion or audio stream.

The audio feature information might include additional information that may assist in labeling the portions. For example, the audio feature information might include information regarding common portion labels (e.g., intro, verse, chorus, bridge, and/or outro). Additionally, or alternatively, the audio feature information might include information regarding common formats of audio streams (e.g., AABA format, verse-chorus format, etc.). Additionally, or alternatively, the audio feature information might include information regarding common genres of audio streams (e.g., rock, jazz, classical, etc.). The format and genre information, when available, might suggest a signature (e.g., arrangement of the different portions) for the audio streams. A common signature for audio streams belonging to the rock genre, for example, may include the chorus appearing once, followed by the bridge, and then followed by the chorus twice consecutively.

Trainer 510 may analyze attributes associated with the audio streams, the portions identified by the break points, the audio feature information, and the human training data to form a set of rules for labeling portions of other audio streams. The rules may be used to form the label model.

Some of the rules that may be generated for the label model might include:

Intro: An intro portion may start at the beginning of the audible frequencies.

Verse: A verse portion generally includes sound within the vocal frequency range. There may be multiple verses with the same or similar chord progression but slightly different lyrics. Thus, similar wave form shapes in the instrumental frequencies with different wave form shapes in the vocal frequencies may be verses.

Bridge: A bridge portion commonly occurs within an audio stream other than at the beginning or end. Generally, a bridge is different in both chord progression and lyrics from the verses and chorus.

Chorus: A chorus portion generally includes a portion that repeats (in both chord progression and lyrics) within the audio stream and may be differentiated from the verse in that the lyrics are generally the same between different occurrences of the chorus.

Outro: An outro portion may include the last portion of an audio stream and generally trails off of the last chorus.

Trainer 510 may form the label model using any of several well known techniques, such as logic regression, boosted decision trees, random forests, support vector machines, perceptrons, and winnow learners. The label model may determine the probability that a particular label is associated with a portion in an audio stream based on one or more attributes, audio feature information, and/or information regarding other portions associated with the audio stream:

P(label|portion, audio attribute(s), audio feature information, other portions), where “portion” may refer to the portion of the audio stream for which a label is being determined, “audio attribute(s)” may refer to one or more of the audio stream attributes identified above that are associated with the portion, “audio feature information” may refer to one or more types of audio feature information identified above, and “other portions” may refer to information (e.g., characteristics, labels, etc.) associated with other portions in the audio stream.

The label model may generate a “score,” which may include a probability output and/or an output value, for a label that reflects the probability that the label is associated with a particular portion. The highest scores (or scores above a threshold) may be determined to be actual labels for the portions of the audio stream.

The output of the label model may include information regarding the portions (e.g., break point identifiers) and their associated labels. This information may be stored as metadata for the audio stream.

Exemplary Processing

Figure 6:
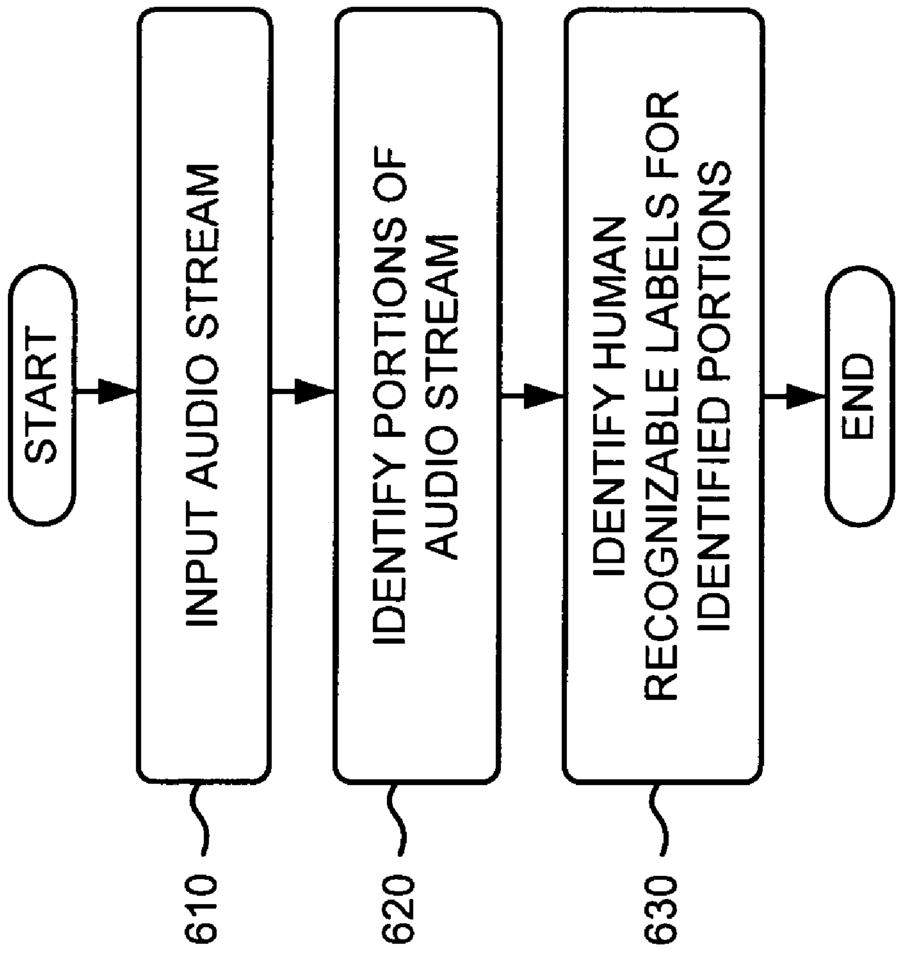
FIG. 6 is a flowchart of exemplary processing for deconstructing an audio stream into human recognizable portions according to an implementation consistent with the principles of the invention.

FIG. 6 is a flowchart of exemplary processing for deconstructing an audio stream into human recognizable portions according to an implementation consistent with the principles of the invention. Processing may begin with the inputting of an audio stream into audio deconstructor 210 (block 610). The audio stream might correspond to a music file or stream and may be one of many audio streams to be deconstructed by audio deconstructor 210. The inputting of the audio stream may correspond to selection of a next audio stream from a set of stored audio streams for processing by audio deconstructor 210.

The audio stream may be processed to identify portions of the audio stream (block 620). In one implementation, the audio stream may be input into a portion model that is trained to identify the different portions of the audio stream with high probability. For example, the portion model may identify the break points between the different portions of the audio stream based on the attributes associated with the audio stream. The break points may identify where the different portions start and end.

Human recognizable labels may be identified for each of the identified portions (block 630). In one implementation, the audio stream, information regarding the break points, and possibly audio feature information (e.g., genre, format, etc.) may be input into a label model that is trained to identify labels for the different portions of the audio stream with high probability. For example, the label model may analyze the instrumental and vocal frequencies associated with the different portions and relationships between the different portions. Portions that repeat identically might be indicative of the chorus. Portions that contain similar instrumental frequencies but different vocal frequencies might be indicative of verses. A portion that contains different instrumental and vocal frequencies from both the chorus and the verses and occurs neither at the beginning or end of the audio stream might be indicative of the bridge. A portion that occurs at the beginning of the audio stream might be indicative of the intro. A portion that occurs at the end of the audio stream might be indicative of the outro.

When information regarding common formats is available, the label model may use the information to improve its identification of labels. For example, the label model may determine whether the audio stream has a signature that appears to match one of the common formats and use the signature associated with a matching common format to assist in the identification of labels for the audio stream. When information regarding genre is available, the label model may use the information to improve its identification of labels. For example, the label model may identify a signature associated with the genre corresponding to the audio stream to assist in the identification of labels for the audio stream.

Once labels have been identified for each of the portions of the audio stream, the audio stream may be stored with its break points and labels stored as metadata associated with the audio stream. The audio stream and its metadata may then be used for various purposes, some of which have been described above.

EXAMPLE

Figure 7:
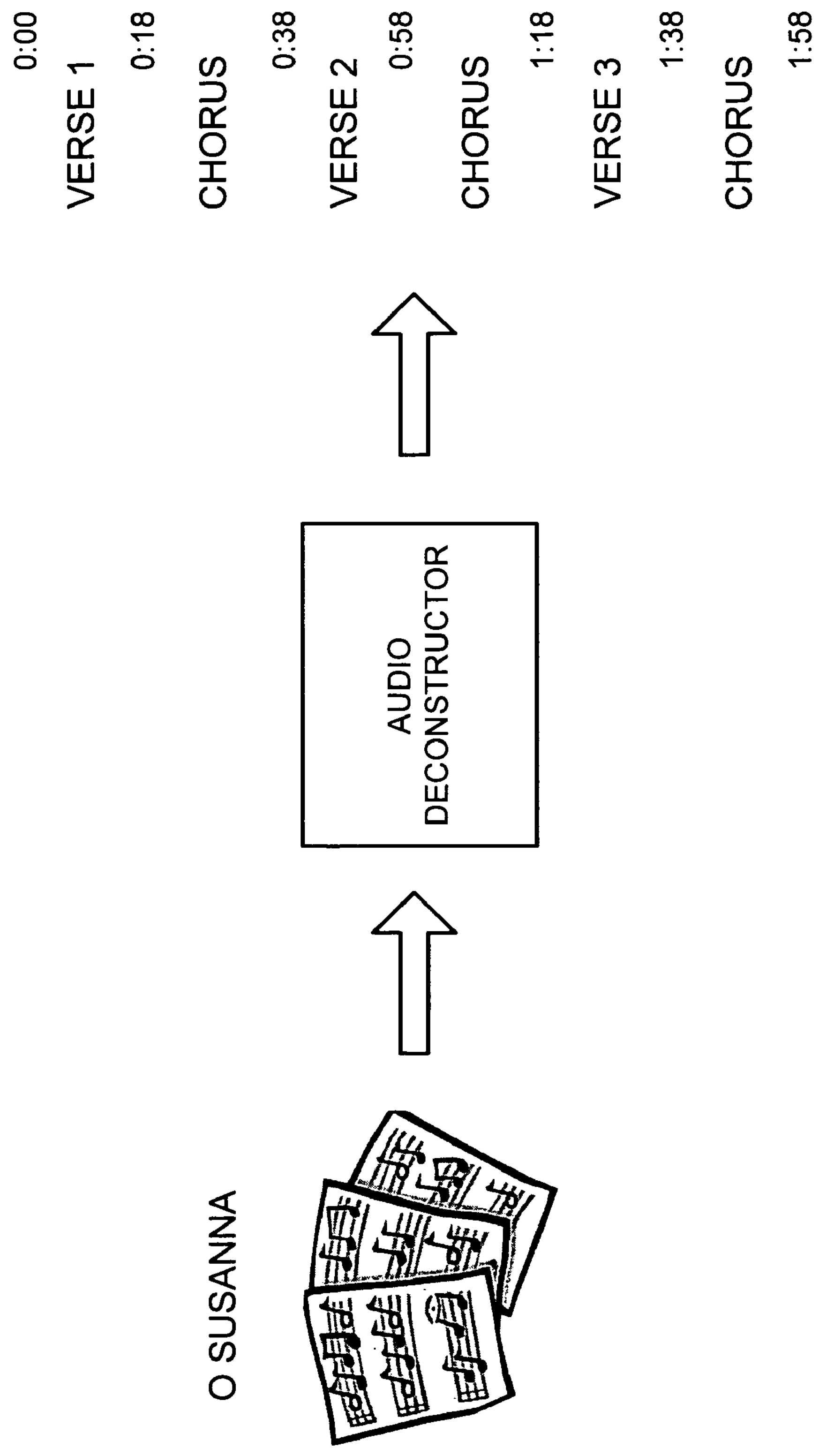

FIGS. 7-9 are diagrams of an exemplary implementation consistent with the principles of the invention. As shown in FIG. 7, assume that the audio deconstructor receives the song "O Susanna." The audio deconstructor may identify break points between portions of the song based on attributes associated with the song. As shown in FIG. 8, assume that the audio deconstructor identifies break points with high probability at time codes 0:18, 0:38, 0:58, 1:18, 1:38, and 1:58. Therefore, the audio deconstructor identifies a first portion that occurs between 0:00 and 0:18, a second portion that occurs between 0:18 and 0:38, a third portion that occurs between 0:38 and 0:58, a fourth portion that occurs between 0:58 and 1:18, a fifth portion that occurs between 1:18 and 1:38, and a sixth portion that occurs after 1:38 until the end of the song at 1:58.

The audio deconstructor may identify labels for the portions of the song based on the attributes associated with the song, information regarding the break points, and possibly audio feature information (e.g., genre, format, etc.). For example, the audio deconstructor may analyze the instrumental and vocal frequencies associated with the different portions and relationships between the different portions. As shown in FIG. 9, the audio deconstructor may identify portions 2, 4, and 6 as the chorus because, for example, these portions repeat identically in both the instrumental and vocal frequencies. As further shown in FIG. 9, the audio deconstructor may identify portions 1, 3, and 5 as verses because, for example, these portions contain similar instrumental frequencies but different vocal frequencies.

The audio deconstructor may output the break points and the labels as metadata associated with the song. In this case, the metadata might indicate that the song begins with verse 1 that occurs until 0:18, followed by the chorus that occurs between 0:18 and 0:38, followed by verse 2 that occurs between 0:38 and 0:58, followed by the chorus that occurs between 0:58 and 1:18, followed by verse 3 that occurs between 1:18 and 1:38, and finally followed by the chorus after 1:38 until the end of the song, as shown in FIG. 7.

CONCLUSION

Implementations consistent with the principles of the invention may generate one or more models that may be used to identify portions of an electronic media stream and/or identify labels for the identified portions.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 6, the order of the acts may be modified in other implementations consistent with the principles of the invention. Further, non-dependent acts may be performed in parallel.

Techniques for deconstructing an electronic media stream have been described above. In addition, or as an alternative, to these techniques, it may be beneficial to detect individual instruments in the electronic media stream. The frequency ranges associated with the instruments may be determined and mapped against expected introduction of the instruments in well known arrangements. If a match with a well known arrangement is found, then information regarding its portions and labels may be used to facilitate identification of the portions and/or labels for the electronic media stream.

While the preceding description focused on deconstructing audio streams, the description may equally apply to deconstruction of other forms of media, such as video streams. For example, the description may be useful for deconstructing music videos and/or other types of video streams based, for example, on the tempo of, or chords present in, their background music.

Moreover, the term "stream" has been used in the description above. The term is intended to mean any form of data whether embodied in a carrier wave or stored as a file in memory.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system, comprising:

an audio deconstructor to:

identify break points within an audio stream, each of the break points identifying a beginning or end of one of a plurality of portions within the audio stream, input the audio stream and information regarding the plurality of portions into a model trained to generate scores to identify labels for portions of audio streams based on attributes of the audio streams, audio feature information associated with the audio streams, and information regarding other portions within the audio streams, the scores being indicative of a probability that a label associated with a particular one of the plurality of portions within the audio stream is an actual label for the particular one of the plurality of portions, and select, based on the generated scores of the model, a human recognizable label for each of the plurality portions within the audio stream.

2. A method performed by one or more devices, comprising:

training, using one or more processors associated with the one or more devices, a first model to identify portions of electronic media streams based on first attributes of the electronic media streams;

training, using one or more processors associated with the one or more devices, a second model to identify labels for identified portions of the electronic media streams based on second attributes of the electronic media streams, feature information associated with the electronic media streams, and information regarding other portions within the electronic media streams, and the second model to generate a score for each of the identified labels, where the score is indicative of a probability that a label associated with a particular one of the identified portions of the electronic media streams is an actual label for the particular one of the identified portions;

inputting, by one or more processors associated with the one or more devices, an electronic media stream into the first model;

identifying, using one or more processors associated with the one or more devices, based on an output of the first model, portions of the electronic media stream;

inputting, by one or more processors associated with the one or more devices, the electronic media stream and information regarding the identified portions into the second model;

determining, using one or more processors associated with the one or more devices, based on an output of the second model, human recognizable labels for the identified portions; and generating, using the second model, a score for each label of the determined human recognizable labels.

3. A method performed by one or more devices, comprising:

generating, using one or more processors associated with the one or more devices, rules for a first model, the first model determining, based on a plurality of attributes associated with a particular audio stream, a probability that each of a plurality of instances in the particular audio stream is a break point associated with one of a plurality of portions of the particular audio stream;

generating, using one or more processors associated with the one or more devices, rules for a second model, the second model generating a score for each label, of a plurality of labels, for each one of the plurality of portions of the particular audio stream based on one or more of the plurality of attributes associated with the one of the plurality of portions, audio feature information associated with the particular audio stream, and information regarding one or more other ones of the plurality of portions, where the score is indicative of a probability that a label associated with a particular one of the plurality of portions of the particular audio stream is an actual label for the particular one of the plurality of portions;

inputting, by one or more processors associated with the one or more devices, an audio stream into the first model;

identifying, using one or more processors associated with the one or more devices, based on an output of the first model, a plurality of break points corresponding to a plurality of portions of the audio stream;

inputting, by one or more processors associated with the one or more devices, the audio stream and information relating to the identified plurality of break points into the second model;

identifying, using one or more processors associated with the one or more devices, based on an output of the second model, labels for the plurality of portions of the audio stream;

generating, using the second model, scores for the identified labels for the plurality of portions of the audio stream;

selecting, using one or more processors associated with the one or more devices, a particular label, from the identified labels, for each one of the plurality of portions of the audio stream, based on the generated scores; and storing, by one or more processors associated with the one or more devices, information regarding the plurality of break points and the selected label for each one of the plurality of portions of the audio stream.

4. The method of claim 3, where generating the rules for the first model includes:

forming rules for the first model based on human training data associated with a training set of audio streams and attributes associated with the training set of audio streams.

5. The method of claim 4, where the human training data includes information regarding portions associated with the training set of audio streams provided by human operators.

6. The method of claim 4, where the attributes associated with the training set of audio streams include at least one of intensity, volume, or patterns associated with the training set of audio streams.

7. The method of claim 4, where the rules for the first model include at least one of:

a rule that a change in volume is an indicator of a break point between portions, a rule that a change in level or intensity for one or more frequency ranges is an indicator of a break point between portions, or a rule that a change in a beat pattern is an indicator of a break point between portions.

8. The method of claim 3, where generating the rules for the second model includes:

forming rules for the second model based on human training data associated with a training set of audio streams and attributes associated with the training set of audio streams.

9. The method of claim 8, where the human training data includes information regarding labels for portions associated with the training set of audio streams provided by human operators.

10. The method of claim 8, where the attributes associated with the training set of audio streams include frequency information associated with the training set of audio streams.

11. The method of claim 8, where the rules for the second model are further based on at least one of information regarding common portion labels, information regarding common formats of audio streams, or information regarding common genres of audio streams.

12. The method of claim 3, each of the plurality of break points corresponding to one of a plurality of break point identifiers that relate to a beginning or an end of one of the plurality of portions of the audio stream, where the plurality of break point identifiers correspond to time codes relating to the beginning or the end of the one of the plurality of portions of the audio stream.

13. The method of claim 12, where a pair of break point identifiers correspond to a particular one of a plurality of portions of the particular audio stream, a first one of the pair of break point identifier of the pair of break point identifiers corresponding to a beginning of the particular one of the plurality of portions of the audio stream and a second one of the pair of break point identifier of the pair of break point identifiers corresponding to an end of the particular one of the plurality of portions of the audio stream.

14. The method of claim 3, where the rules for the second model include at least one of:

a rule that an intro portion starts at a beginning of audible frequencies, a rule that an outro portion corresponds to a last portion, a rule that a verse portion occurs multiple times with substantially a same chord progression but different lyrics, a rule that a chorus portion repeats with substantially a same chord progression and lyrics, or a rule that a bridge portion differs in both chord progression and lyrics from a verse portion and a chorus portion.

15. The method of claim 3, further comprising:

selecting an audio clip for the audio stream based on the plurality of labels.

16. The method of claim 3, further comprising:

predicting metadata associated with the audio stream based on the plurality of labels.

17. The method of claim 3, further comprising:

permitting a user to skip forward to a beginning of a next one of the plurality of portions while playing one of the plurality of portions of the audio stream to the user, or permitting the user to skip backward to a beginning of a previous one of the plurality of portions while playing the one of the plurality of portions of the audio stream to the user.

18. The method of claim 3, further comprising:

receiving, from a user, a search term;

determining that the search term matches a term that occurs within one of the plurality of portions of the audio stream; and playing all of the one of the plurality of portions to the user.

19. The method of claim 3, further comprising:

determining a score indicative of a probability that a particular one of the plurality of instances in the particular audio stream is a break point; and determining that the particular one of the plurality of instance is an actual break point associated with one of the plurality of portions of the particular audio stream when the score is above a particular threshold.

20. The method of claim 3, where selecting a particular label comprises:

selecting the particular label if a generated score for the particular label is higher than generated scores for each label, of identified labels, for a particular portion of the plurality of portions of the audio stream.

21. A system, comprising:

one or more devices, comprising:

a first memory to store rules for a first model, the first model determining, based on a plurality of attributes associated with a particular electronic media stream, a probability that each of a plurality of instances in the particular electronic media stream is a break point associated with one of a plurality of portions of the particular electronic media stream;

a second memory to store rules for a second model, the second model generating a score for each label, of a plurality of labels for each one of the plurality of portions of the particular electronic media stream, based on one or more of the plurality of attributes associated with the one of the plurality of portions, feature information associated with the particular electronic media stream, and information regarding one or more other ones of the plurality of portions, where the score is indicative of a probability that a label associated with a particular one of the plurality of portions of the particular electronic media stream is an actual label for the particular one of the plurality of portions; and a deconstructor to:

input an electronic media stream into the first model, identify, based on an output of the first model, a plurality of break points corresponding to a plurality of portions of the electronic media stream, input the electronic media stream and information relating to the identified plurality of break points into the second model, identify, based on an output of the second model, labels for the plurality of portions of the electronic media stream, generate, based on the second model, scores for the identified labels for the plurality of portions, and select a particular label, from the identified labels, for each of the plurality of portions, based on the generated scores.

22. The system of claim 21, where the rules for the first model are generated based on human training data associated with a training set of electronic media streams and attributes associated with the training set of electronic media streams.

23. The system of claim 22, where the human training data includes information regarding portions associated with the training set of electronic media streams provided by human operators.

24. The system of claim 22, where the attributes associated with the training set of electronic media streams include at least one of intensity, volume, or patterns associated with the training set of electronic media streams.

25. The system of claim 22, where the rules for the first model include at least one of:

a rule indicating that a change in volume is an indicator of a break point between portions, a rule indicating that a change in level or intensity for one or more frequency ranges is an indicator of a break point between portions, or a rule indicating that a change in a beat pattern is an indicator of a break point between portions.

26. The system of claim 21, where the rules for the second model are generated based on human training data associated with a training set of electronic media streams and attributes associated with the training set of electronic media streams.

27. The system of claim 26, where the human training data includes information regarding labels for portions associated with the training set of electronic media streams provided by human operators.

28. The system of claim 26, where the attributes associated with the training set of electronic media streams include frequency information associated with the training set of electronic media streams.

29. The system of claim 26, where the rules for the second model are further based on at least one of information regarding common portion labels, information regarding common formats of electronic media streams, or information regarding common genres of electronic media streams.

30. The system of claim 21, each of the plurality of break points corresponding to at least one of a plurality of break point identifiers that relate to a beginning or an end of a particular one of the plurality of portions of the electronic media stream, where the plurality of break point identifiers correspond to time codes relating to a beginning or an end of each of the plurality of portions of the electronic media stream.

31. The system of claim 21, where the rules for the second model include at least one of:

a rule indicating that an intro portion starts at a beginning of audible frequencies, a rule indicating that an outro portion corresponds to a last portion, a rule indicating that a verse portion occurs multiple times with substantially a same chord progression but different lyrics, a rule indicating that a chorus portion repeats with substantially a same chord progression and lyrics, or a rule indicating that a bridge portion differs in both chord progression and lyrics from a verse portion and a chorus portion.

32. The system of claim 21, further comprising:

logic to select an electronic media clip for the electronic media stream based on the plurality of labels.

33. The system of claim 21, further comprising:

logic to predict metadata associated with the electronic media stream based on the plurality of labels.

34. The system of claim 21, further comprising:

logic to permit a user to skip forward to a beginning of a next one of the plurality of portions while playing one of the plurality of portions of the electronic media stream to the user, or logic to permit the user to skip backward to a beginning of a previous one of the plurality of portions while playing the one of the plurality of portions of the electronic media stream to the user.

35. The system of claim 21, further comprising:

logic to receive, from a user, a search term;

logic to determine that the search term matches a term that occurs within one of the plurality of portions of the electronic media stream; and logic to play all of the one of the plurality of portions to the user.

36. The system of claim 21, further comprising:

a third memory to store the information relating to the plurality of break points and the labels for the plurality of portions of the electronic media stream as metadata for the electronic media stream.

37. The system of claim 21, further comprising:

logic to identify a particular arrangement of certain ones of the plurality of portions of an electronic media stream as a signature;

logic to identify a plurality of electronic media streams with similar signatures; and logic to organize the identified plurality of electronic media streams into a cluster.

* * * * *

UNITED STATES PATENT AND TRADEMARK OFFICE

CERTIFICATE OF CORRECTION

PATENT NO. : 7,668,610 B1
APPLICATION NO. : 11/289527
DATED : February 23, 2010
INVENTOR(S) : Victor Bennett It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 818 days.

Signed and Sealed this

Seventh Day of December, 2010

David J. Kappos

*Director of the United States Patent and Trademark Office*